United States Patent
Garin et al.

(10) Patent No.: US 9,341,720 B2
(45) Date of Patent: May 17, 2016

(54) CAMERA-BASED POSITION LOCATION AND NAVIGATION BASED ON IMAGE PROCESSING

(75) Inventors: Lionel J. Garin, Palo Alto, CA (US); Ayman Naquib, Cupertino, CA (US); Charles A. Bergan, Cardiff, CA (US)

(73) Assignee: QUALCOMM Incorporated, San Diego, CA (US)

(*) Notice: Subject to any disclaimer, the term of this patent is extended or adjusted under 35 U.S.C. 154(b) by 586 days.

(21) Appl. No.: 13/173,984

(22) Filed: Jun. 30, 2011

(65) Prior Publication Data

US 2012/0176491 A1 Jul. 12, 2012

Related U.S. Application Data

(60) Provisional application No. 61/431,742, filed on Jan. 11, 2011.

(51) Int. Cl.
*H04N 7/18* (2006.01)
*G01S 19/23* (2010.01)
*G01S 19/49* (2010.01)

(52) U.S. Cl.
CPC .............. *G01S 19/235* (2013.01); *G01S 19/49* (2013.01)

(58) Field of Classification Search
CPC .......... H04N 7/18; G01S 19/49; G01S 19/235
USPC ........................................................ 348/113
See application file for complete search history.

(56) References Cited

U.S. PATENT DOCUMENTS

| 6,337,688 | B1* | 1/2002 | Berstis | 345/473 |
| 6,542,824 | B1* | 4/2003 | Berstis | 701/472 |
| 2004/0078137 | A1 | 4/2004 | Breakfield et al. | |
| 2006/0184013 | A1* | 8/2006 | Emanuel et al. | 600/426 |
| 2007/0081695 | A1* | 4/2007 | Foxlin et al. | 382/103 |
| 2007/0199108 | A1* | 8/2007 | Angle et al. | 901/17 |
| 2008/0133366 | A1 | 6/2008 | Evans et al. | |

(Continued)

FOREIGN PATENT DOCUMENTS

| CN | 101939665 A | 1/2011 |
| JP | 2004138513 A | 5/2004 |

(Continued)

OTHER PUBLICATIONS

Serra et al., Inertial Navigation Systems for User-Centric Indoor Applications, Oct. 2010.*

(Continued)

*Primary Examiner* — Jay Patel
*Assistant Examiner* — Francis G Geroleo
(74) *Attorney, Agent, or Firm* — Silicon Valley Patent Group LLP

(57) ABSTRACT

An apparatus and method for estimating a position of a mobile device based on one or more images is disclosed. Positioning information is derived from an image containing an SAS (self-addressing source such as a QR code), thereby setting a first vector $V_1$ and an SAS pose. The image is also used to determine a displacement between the mobile device and the self-addressing source, thereby setting a second vector $V_2$. Using the first vector $V_1$, the SAS pose and the second vector $V_2$, the mobile device may estimate its position with high accuracy and may also recalibrate dead-reckoning navigation and a gyrometer.

45 Claims, 13 Drawing Sheets

(56) References Cited

U.S. PATENT DOCUMENTS

| | | | |
|---|---|---|---|
| 2008/0137912 A1 | 6/2008 | Kim et al. | |
| 2008/0154714 A1 | 6/2008 | Liu et al. | |
| 2009/0115638 A1* | 5/2009 | Shankwitz et al. | 340/988 |
| 2009/0307067 A1 | 12/2009 | Obermeyer | |
| 2010/0176987 A1* | 7/2010 | Hoshizaki | 342/357.02 |
| 2011/0178708 A1* | 7/2011 | Zhang et al. | 701/221 |
| 2012/0143495 A1* | 6/2012 | Dantu | 701/428 |

FOREIGN PATENT DOCUMENTS

| | | |
|---|---|---|
| JP | 2006195913 A | 7/2006 |
| JP | 2007147528 A | 6/2007 |
| JP | 2008003253 A | 1/2008 |
| JP | 2008309530 A | 12/2008 |
| JP | 2009020014 A | 1/2009 |
| JP | 2009503532 A | 1/2009 |
| TW | 201024674 A | 7/2010 |
| WO | WO2009098319 A2 | 8/2009 |

OTHER PUBLICATIONS

George M et al., "Camera Aided Inertial Navigation in Poor GPS Environments", Aerospace Conference, 2007 IEEE, IEEE, Piscataway, NJ, USA, Mar. 3, 2007, pp. 1-12,XP031214068,ISBN: 978-1-4244-0524-4.

International Search Report—PCT/US2012/020624, International Search Authority—European Patent Office—May 4, 2012.

Mirzaei et al., "A Kalman Filter-Based Algorithm for IMU-Camera Calibration: Observability Analysis and Performance Evaluation", IEEE Transactions on Robotics, vol. 24, No. 5, Oct. 2008.

Taiwan Search Report—TW101100973—TIPO—Jan. 22, 2014.

Davison A. J., "Real-Time Simultaneous Localisation and Mapping with a Single Camera," Proceedings of the Ninth IEEE International Conference on Computer Vision (ICCV'03), IEEE, 2003, pp. 1-8.

Farley M. G. et al., "Monocular Slam—Alternative Navigation for GPS-Denied Areas," GPS World, Military & Government—Personal Navigation, Sep. 2008, pp. 42-49.

\* cited by examiner

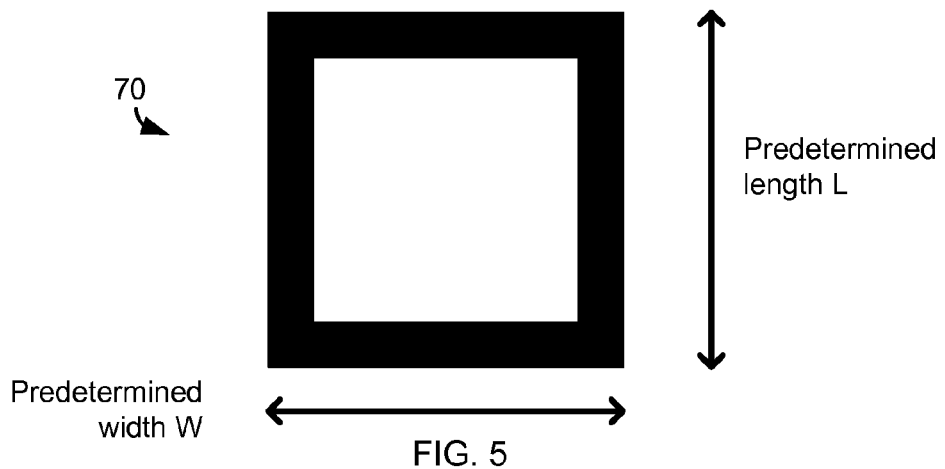
FIG. 5
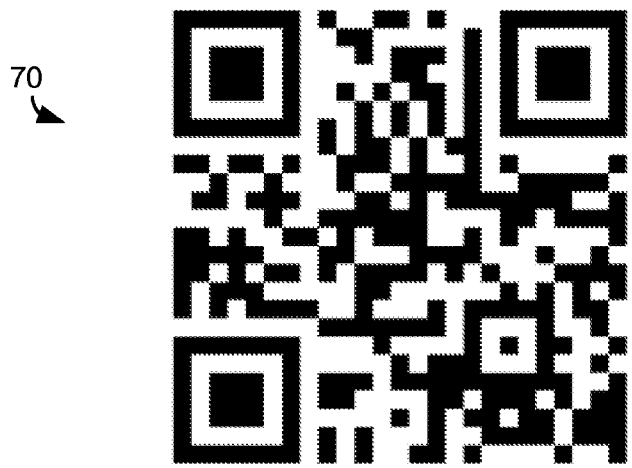
FIG. 6
Encoded or linked information from SAS 70:
1. Position of SAS 70 relative to a local reference system (e.g., (u, v, w) meters to building reference point)
2. Position of SAS 70 relative to a global reference system (e.g., LLA)
3. Pose (e.g., φ, θ, ψ) of SAS 70 relative to reference the local reference system
4. Pose (e.g., φ, θ, ψ) of SAS 70 relative to the global reference system
5. Size or dimensions of SAS 70
FIG. 7

| Reference system | Position of reference 80 | Position of SAS 70 | Position of mobile device 100 |
|---|---|---|---|
| Global reference system | $(LLA_{80})$ | $(LLA_{70})$ | $(LLA_{100})$ |
| $(X_{local}, Y_{local}, Z_{local})$ | (0, 0, 0) | (u, v, w) | (ρ, θ, φ) |
| $(X_{SAS}, Y_{SAS}, Z_{SAS})$ | - | (0, 0, 0) | (D, α, β) |
| $(X_{mobile}, Y_{mobile}, Z_{mobile})$ | - | - | (0, 0, 0) |

CAMERA-BASED POSITION LOCATION AND NAVIGATION BASED ON IMAGE PROCESSING

CROSS-REFERENCE TO RELATED APPLICATIONS

This application claims priority to and the benefit of U.S. Provisional Application 61/431,742 filed on Jan. 11, 2011 titled "Navigation based on image processing", which is incorporated by reference herein in its entirety.

BACKGROUND

I. Field of the Invention

This disclosure relates generally to apparatus and methods for camera-based navigation based on image processing. More particularly, the disclosure relates to camera-based pedestrian navigation for indoor and urban environments, where satellite reception is unavailable, restricted, or nonexistent, based on image processing and feature interpretation.

II. Background

Many personal navigation devices (PNDs) include a Global Navigation Satellite System (GNSS), which receives GNSS signals and provides outdoor navigation. When GNSS signals are partially blocked, such as in an urban environment, determined position estimates deteriorates. When GNSS signals are available but inadequate, a PND may supplement a GNSS-based position estimate with one or more terrestrial-based positioning methods.

When GNSS signals are totally blocked, such as when indoors, a PND has no GNSS signals to compute a position estimate. To compensate for weak or blocked GNSS signals, a PND may use multiple terrestrial-based positioning methods to compute a position estimate. Alternatively, a PND may implement position estimation based solely on a terrestrial-based positioning method. One such terrestrial-based positioning method uses cellular-based position location techniques. Unfortunately, cellular-based techniques often result in a position location having a low resolution and an unacceptable high level of uncertainty.

Another such terrestrial-based positioning method is an inertial navigation system (INS), which may use dead reckoning to form a position estimate. Dead reckoning uses inertial sensor measurements to accumulate movement. Inertial sensors, such as MEMS accelerometers and/or MEMS gyrometers, integrate and accumulate movement to determine a step of movement. That is, a position estimate from dead reckoning is based on a determined incremental change in position summed with a previous position estimate.

Each new position estimate also accumulates position error from current inertial measurements with errors from past position estimates. Each inertial sensor measurement may include 3-5% of error and each time this error is summed to form a new position estimate, the error accumulates, therefore an estimated position may quickly depart from an actual position.

Dead reckoning may be improved by localizing transmissions from an access point (AP). For example, a mobile device may determine its position using a location of a known WIFI base station. Such locations must be determined using by a priori mapping, triangulation, signal strength and/or round-trip delay computations. These radio techniques may be difficult to model and may require extensive calibration and measurements across a large number of sampled positions within building (e.g., a measurement may be taken at least once within every square meter to map building) and may still result in low precision or low resolution position estimates. Therefore an improved method for position estimate is desired.

BRIEF SUMMARY

Disclosed is an apparatus and method for determining a position of a mobile device and for recalibrating a dead-reckoning system based on one or more images.

According to some aspects, disclosed is a method for calibrating dead-reckoning navigation in a mobile device comprising a camera, the method comprising: providing an initial position; detecting an SAS (self-addressing source); determining a first vector $V_1$ between the SAS and a reference point; determining an SAS pose relative to the reference point; determining a second vector $V_2$ of the mobile device relative to the SAS; computing a third vector $V_3$ of the mobile device based on the first vector $V_1$, the SAS pose and the second vector $V_2$; and recalibrating a current position of the mobile device based on the third vector $V_3$.

According to some aspects, disclosed is a mobile device comprising a camera and a dead-reckoning navigation system, the mobile device comprising: means for providing an initial position; means for detecting an SAS (self-addressing source); means for determining a first vector $V_1$ between the SAS and a reference point; means for determining an SAS pose relative to the reference point; means for determining a second vector $V_2$ of the mobile device relative to the SAS; means for computing a third vector $V_3$ of the mobile device based on the first vector $V_1$, the SAS pose and the second vector $V_2$; and means for recalibrating a current position of the mobile device based on the third vector $V_3$.

According to some aspects, disclosed is a mobile device comprising a processor and a memory wherein the memory includes software instructions to: provide an initial position; detect an SAS (self-addressing source); determine a first vector $V_1$ between the SAS and a reference point; determine an SAS pose relative to the reference point; determine a second vector $V_2$ of the mobile device relative to the SAS; compute a third vector $V_3$ of the mobile device based on the first vector $V_1$, the SAS pose and the second vector $V_2$; and recalibrate a current position of the mobile device based on the third vector $V_3$.

According to some aspects, disclosed is a computer-readable storage medium including program code stored thereon for a mobile device, the program code comprising code to: provide an initial position; detect an SAS (self-addressing source); determine a first vector $V_1$ between the SAS and a reference point; determine an SAS pose relative to the reference point; determine a second vector $V_2$ of the mobile device relative to the SAS; compute a third vector $V_3$ of the mobile device based on the first vector $V_1$, the SAS pose and the second vector $V_2$; and recalibrate a current position of the mobile device based on the third vector $V_3$.

According to some aspects, disclosed is a method for determining a position of a mobile device comprising a camera, the method comprising: detecting an SAS (self-addressing source); determining a first vector V1 between the SAS and a reference point; determining an SAS pose relative to the reference point; determining a second vector V2 of the mobile device relative to the SAS; computing a third vector V3 of the mobile device based on the first vector V1, the SAS pose and the second vector V2; and computing a current position of the mobile device based on the third vector V3.

According to some aspects, disclosed is a mobile device comprising a camera, the mobile device comprising: means for detecting an SAS (self-addressing source); means for determining a first vector V1 between the SAS and a reference point; means for determining an SAS pose relative to the reference point; means for determining a second vector V2 of the mobile device relative to the SAS; and means for computing a third vector V3 of the mobile device based on the first vector V1, the SAS pose and the second vector V2.

According to some aspects, disclosed is a mobile device comprising a processor and a memory wherein the memory includes software instructions to: detect an SAS (self-addressing source); determine a first vector V1 between the SAS and a reference point; determine an SAS pose relative to the reference point; determine a second vector V2 of the mobile device relative to the SAS; and compute a third vector V3 of the mobile device based on the first vector V1, the SAS pose and the second vector V2.

According to some aspects, disclosed is a computer-readable storage medium including program code stored thereon for a mobile device, the program code comprising code to: detect an SAS (self-addressing source); determine a first vector V1 between the SAS and a reference point; determine an SAS pose relative to the reference point; determine a second vector V2 of the mobile device relative to the SAS; and compute a third vector V3 of the mobile device based on the first vector V1, the SAS pose and the second vector V2.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

FIGS. 4-6 show examples of sources, in accordance with some embodiments of the present invention.

FIG. 7 presents alphanumeric information extracted from a self-addressing source, in accordance with some embodiments of the present invention.

DETAILED DESCRIPTION

Figure 1:
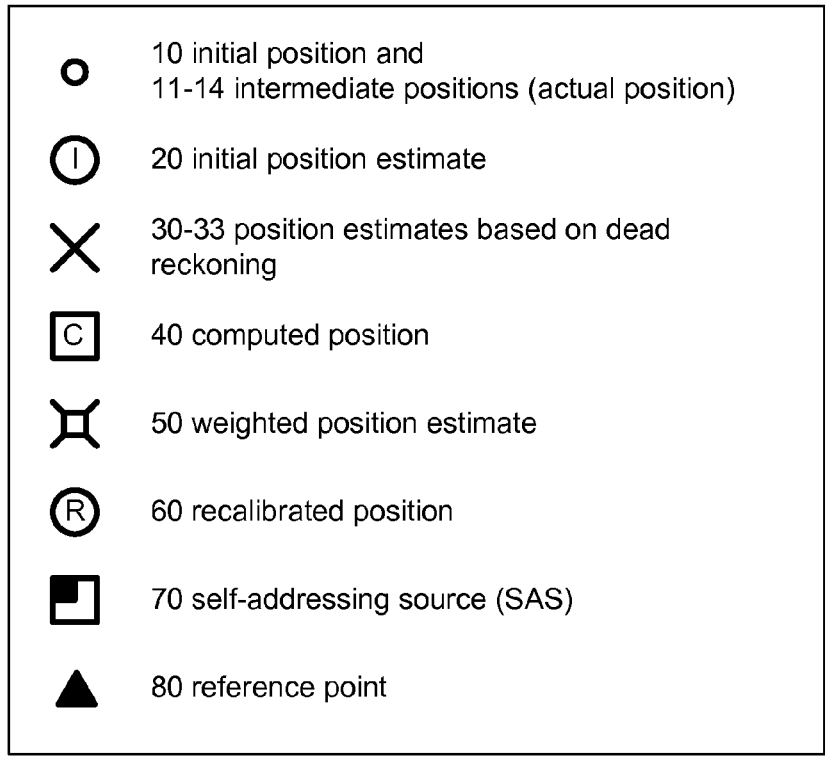
FIG. 1 presents a legend for the accompanying illustrations.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques to determine an estimated position described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE) network, and so on. A CDMA network may implement one or more radio access technologies (RATs) such as cdma2000, Wideband-CDMA (W-CDMA), and so on. Cdma2000 includes IS-95, IS-2000 and IS-856 standards. A TDMA network may be implemented with a Global System for Mobile Communications (GSM) system, Digital Advanced Mobile Phone System (D-AMPS), or some other radio access technology (RAT). GSM, W-CDMA and LTE standards are described in documents from a consortium named "$3^{rd}$ Generation Partnership Project" (3GPP). The cdma2000 standard is described in documents from a consortium named "$3^{rd}$ Generation Partnership Project 2" (3GPP2). 3GPP and 3GPP2 documents are publicly available. WLAN may be implemented with an IEEE 802.11x standards. WPAN may be implemented with a Bluetooth, an IEEE 802.15x, or other standard. The techniques may also be implemented in conjunction with any combination of WWAN, WLAN and/or WPAN.

A satellite positioning system (SPS) typically includes a system of transmitters positioned to enable entities to determine their location on or above the Earth and are based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of a Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using a PN code with different phases, using different PN codes for each satellite as in GPS, or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems (e.g., Quasi-Zenith Satellite System (QZSS) over Japan, Indian Regional Navigational Satellite System (IRNSS) over India, Beidou over China, etc.) and/or various augmentation systems (e.g., an Satellite Based Augmentation System (SBAS)) that may be associated with or otherwise enabled for use with one or more global and/or regional navigation satellite systems. By way of example but not limitation, an SBAS system may include one or more augmentation systems that provide integrity information, differential corrections, etc. (e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like). Thus, as used herein SPS or GPS may include any combination of one or more global and/or regional navigation satellite systems and/or augmentation systems, and SPS signals may include SPS, SPS-like, and/or other signals associated with such one or more SPS.

As used herein, a mobile device refers to a device such as a mobile station (MS), user equipment (UE), a cellular phone or other wireless communication device, personal communication system (PCS) device, personal navigation device (PND), Personal Information Manager (PIM), Personal Digital Assistant (PDA), laptop or other suitable mobile station that is capable of receiving wireless communication and/or navigation signals. The term mobile device is also intended to include devices that communicate with a personal navigation device (PND), such as by short-range wireless, infrared, wireline connection, or other connection, regardless of whether satellite signal reception, assistance data reception and/or position-related processing occurs at the mobile device or remotely. Also, a mobile device includes all devices, including wireless communication devices, computers, laptops, etc. that are capable of communication with a server via the Internet, WiFi, or other network, and regardless of whether satellite signal reception, assistance data reception, and/or position-related processing occurs at the mobile device, at a server, or at another device associated with the network. Any operable combination of the above are also considered a mobile device.

In accordance with the present invention, a mobile device uses a first displacement from a reference point to a self-addressing source, a pose of the self-addressing source relative to a local reference system, and a second displacement between a mobile device and the self-addressing source to compute its position estimate with high precision and high resolution and to realign its dead reckoning parameters. The second displacement is determined from an image, which may be acquired or captured with a single camera, such as a cell phone camera. Alternatively, the image may be acquired or captured with a stereoscopic camera or with a video camera. In this manner, a priori mapping a building with a large number of sampled positions may not be necessary.

A mobile device uses inertial sensors to determine a step length and direction. Alternatively, the mobile device identifies two or more features in a first image then identifies these features in a second image to track movement of each feature from the first image to the second image. A self-location and mapping (SLAM) technique may be used to determine a step length and direction. Alternatively, a magnetometer may be used to determine the direction and a SLAM technique may be used to determine a step length. Successive pairs of images may be used to identify and track a plurality of features or landmarks moving across multiple of the captured plurality of images. In this manner, the mobile device may identify where it is versus landmarks and reference positions.

FIG. 1 presents a legend for the accompanying illustrations. A first icon represents an actual or true position of a mobile device 100, which may be an initial position 10 or intermediate positions 11-14. A second icon represents an initial position estimate 20 of a mobile device 100. A third icon represents a position estimate 30-34 based on dead reckoning. A fourth icon represents a computed position 40. A fifth icon represents a weighted position estimate 50. A sixth icon represents a recalibrated position 60. A seventh icon represents an SAS 70 (self-addressing source). An eighth icon represents a reference 80.

Figure 2:
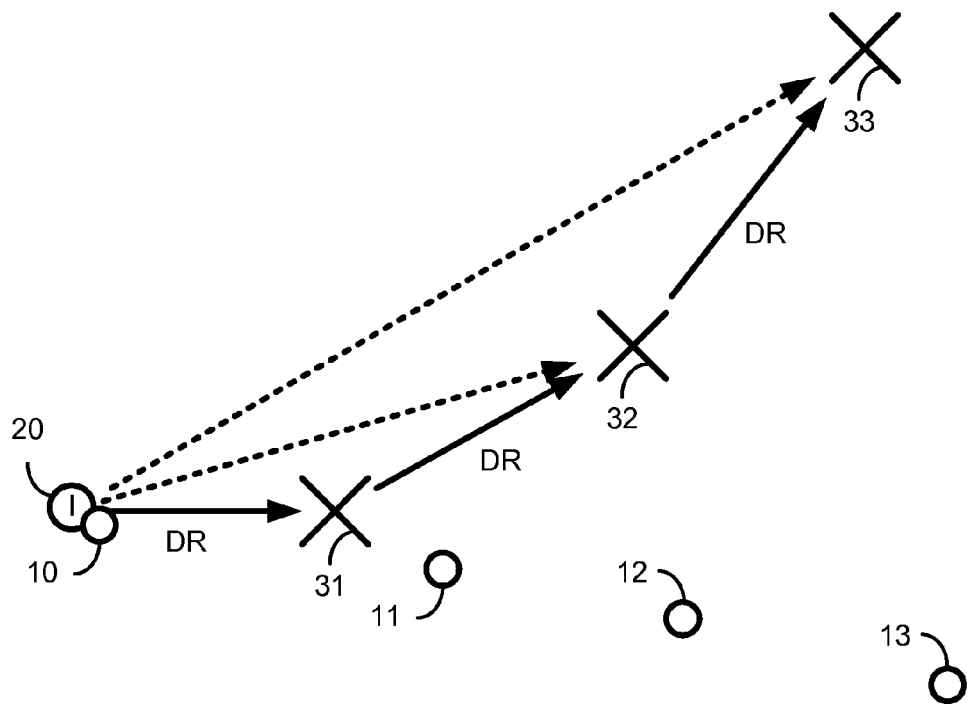
FIG. 2 illustrates drifting and unbounded error in position estimates from dead reckoning.

FIG. 2 illustrates drifting and unbounded error inherent with position estimates from dead reckoning or other inertial sensor and image-based position estimate technique. In the scenario shown, a mobile device 100 travels from an initial position 10 at an initial time to a first intermediate position 11 at a first time, to a second intermediate position 12 at a second time, and to a third intermediate position 13 at a third time. An initial position estimate 20 is used as a base position. This initial position estimate 20 may be determined based on GNSS signal or other absolute positioning technique. Alternatively, the initial position estimate 20 may be set to a relative reference location (e.g., at an origin of an arbitrary reference system (0, 0, 0)) and later determined by backtracking from a later-determined position estimate in a building or local reference system. Alternatively, the initial position estimate 20 may be set based on processing an image of a SAS 70.

At incremental times, the mobile device 100 may use a dead-reckoning technique to determine an initial position estimate 30 at an initial time, a first position estimate 31 at the first time, a second position estimate 32 at the second time, and a third position estimate 33 at the third time. As described earlier, error accumulates with each incremental position estimate, which results in the possibility of subsequent position estimates drifting farther from a mobile device's actual positions. Embodiments of the present invention use optical sources for image-based positioning to recalibrate the dead-reckoning technique and remove this accumulated error from subsequent position estimates.

Figure 3:
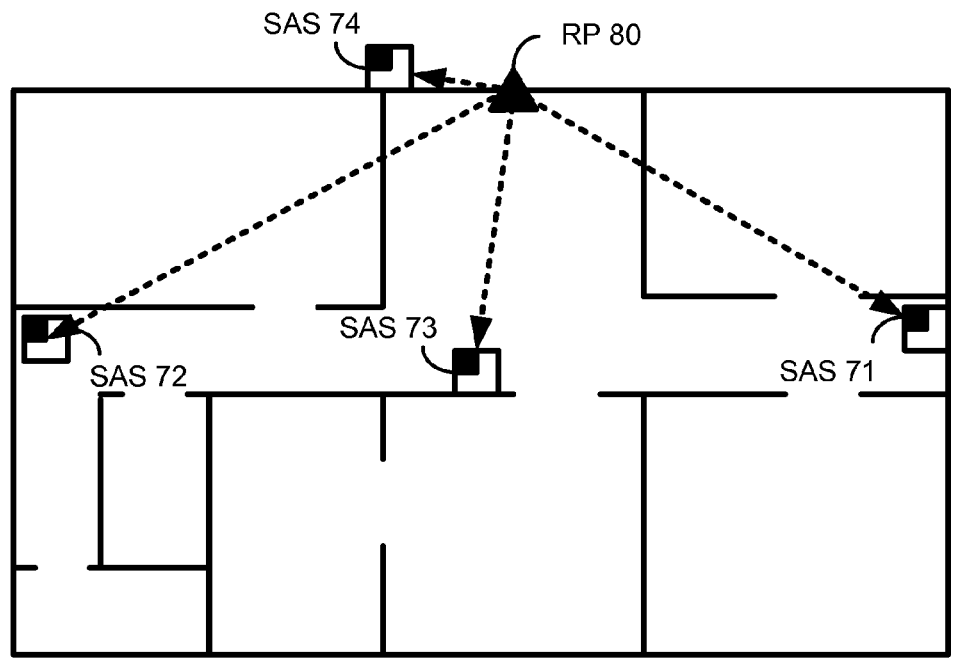
FIG. 3 shows a building floor plan with several self-addressing sources positioned relative to a reference point, in accordance with some embodiments of the present invention.

FIG. 3 shows a building floor plan with several self-addressing sources (SAS 71, SAS 72, SAS 73 and SAS 74) positioned relative to a reference 80, in accordance with some embodiments of the present invention. The reference 80 may itself be a self-addressing source or collocated with a self-addressing source. The reference 80 provides a reference point and reference orientation to which the self-addressing sources may be arranged. A convenient location for the reference 80 may be a ground-level corner of a building and may be aligned and oriented with the square edges of the building or the Cardinal directions. A convenient location for a self-addressing source (SAS 71, SAS 72, SAS 73 and SAS 74) may be attached to an exterior or interior wall, for example, at the end of a hallway (SAS 71), at an intersection of hallways (SAS 72), near an interior doorway (SAS 73), or near an outside entrance (SAS 74).

Figure 4:
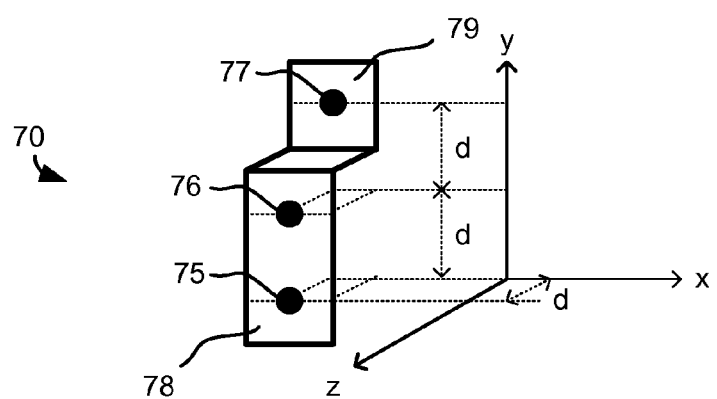

FIGS. 4-6 show examples of sources, in accordance with some embodiments of the present invention.

In FIG. 4, an SAS 70 is a three-dimensional structure and takes advantage of a parallax formed by three light emitting diodes (LEDs) when viewed from different azimuths and elevations. A parallax is an apparent displacement or difference in the relative and apparent position of the LEDs when viewed from different lines of sight. The SAS 70 includes a first LED 75 and a second LED 76 in a first plane 78, and a third LED 77 in a second plane 79. The second plane 79 is shown parallel to the first plane 78 and offset from the first plane 78 by a distance d. When projected to the Y-Z plane, the horizontal distance between the first LED 75 and the second LED 76 is a distance d, and between the second LED 76 and the third LED 77 is also a distance d. When projected to the X-Y plane, the vertical distance between the first LED 75 and the second LED 76 is again a distance d, and the distance between the second LED 76 and the third LED 77 is also a distance d.

When viewing the SAS 70 from a distant point along an imaginary axis perpendicular from the second LED 76, the first LED 75, the second LED 76 and the third LED 77 appear as evenly spaced light sources along a vertical line at increments of length d. If viewed at a position above this distant point, the first LED 75, the second LED 76 and the third LED 77 again appear along a straight line but the third LED 77 appears spaced at a greater distance than d from the second LED 76. If viewed at a position below this distant point, the first LED 75, the second LED 76 and the third LED 77 again appear in a straight line but the third LED 77 appears spaced at a distance smaller than d from the second LED 76. If viewed an a position to the right this distant point, the first LED 75 is directly below the second LED 76 but the third LED 77 is displaced to the right of the vertical line formed between the first LED 75 and the second LED 76 but the separation along the vertical axis remains a constant.

In addition, one or more of the LEDs may be modulated to emit a position of the SAS 70 relative to a reference 80 and/or a pose of the SAS 70 relative to the orientation of the reference 80. The pose of the SAS 70 indicates how the SAS 70 is oriented with respect to the orientation of another reference system. Alternatively, one or more of the LEDs may be modulated to emit a link to this information. For example, the SAS 70 may encode alphanumeric information by flashing this information from one or more of the LEDs.

FIG. 5 shows an SAS 70 (though may not be a self-addressing source), which is a two-dimensional black rectangle having sides of a predetermined length L and predetermined width W. This SAS 70 may be printed on a sheet of paper then fixed to a wall. When viewing the SAS 70 from a distant point along a perpendicular axis from the center of the SAS 70, the SAS 70 appears as a rectangle. When viewing the SAS 70 from a point above or below this distant point, the SAS 70 appears as a trapezoid with parallel horizontal sides. When viewing the SAS 70 from a point to the left or right of this distant point, the SAS 70 appears as a trapezoid with parallel vertical sides. By analyzing the lengths of each side or angles formed from a current perspective view, a partial first vector (elevation a and azimuth (3 from the SAS 70 to the mobile device 100) may be determined. If the predetermined length L and predetermined width W are known, then the mobile device 100 may determine a complete first vector (elevation a, azimuth (3 and distance D from the SAS 70 to the mobile device 100).

The mobile device 100 may also determine a second vector by decoding information from the SAS 70 if the SAS 70 contains alphanumeric information encoded in it. The alphanumeric information may include a position the SAS 70 relative to a reference 80 and a pose of the SAS 70 relative to an orientation of the reference 80, or a link to such alphanumeric information. The link may be a URL or an index used to access a database or table of information about various self-addressing sources.

The SAS 70 could be determined by proximity if the SAS 70 are sufficiently separated. Also, instead of a printed SAS 70 as shown in FIG. 5, the SAS 70 may be the outline of a door or doorframe. Typically, a door or doorframe has a standard width and height, which could be used as the predetermined length L and predetermined width W, respectively.

FIG. 6 shows an SAS 70 that is a quick response code (QR code). A QR code is a form of a two-dimensional bar code that encodes alphanumeric information. In the example, the QR code provides a URL link, which a mobile device 100 uses to access additional information. Unlike the SAS 70 of FIG. 4, the SAS 70 of FIGS. 5 and 6 require no power, are two dimensional, and may be printed onto a sheet of paper.

FIG. 7 presents alphanumeric information extracted from an SAS 70, in accordance with some embodiments of the present invention. The SAS 70 may include one or more of: (1) a position of the SAS 70 relative to a reference 80 (e.g., (u, v, w) meters from the reference 80, also expressed as a first vector $V_1$); (2) a position of the SAS 70 relative to a global reference system (e.g., longitude, latitude, elevation (LLA)); (3) a pose of the SAS 70 relative to an orientation of a local reference (e.g., expressed as an SAS pose ($\omega_X$, $\omega_Y$, $\omega_Z$) or in the form of a second rotation matrix $M_2$); (4) a pose of the SAS 70 relative to a global reference system; and (5) a size or dimensions of the SAS 70 (e.g., 20 cm in length, or 30 cm in height and 20 cm in width). Alternately, the SAS 70 may include other self-addressing information as well. The alphanumeric information may provide this information directly (e.g., as encode text) or indirectly in a link (e.g., an index or URL) to this information, which may be on a server.

Figure 8:
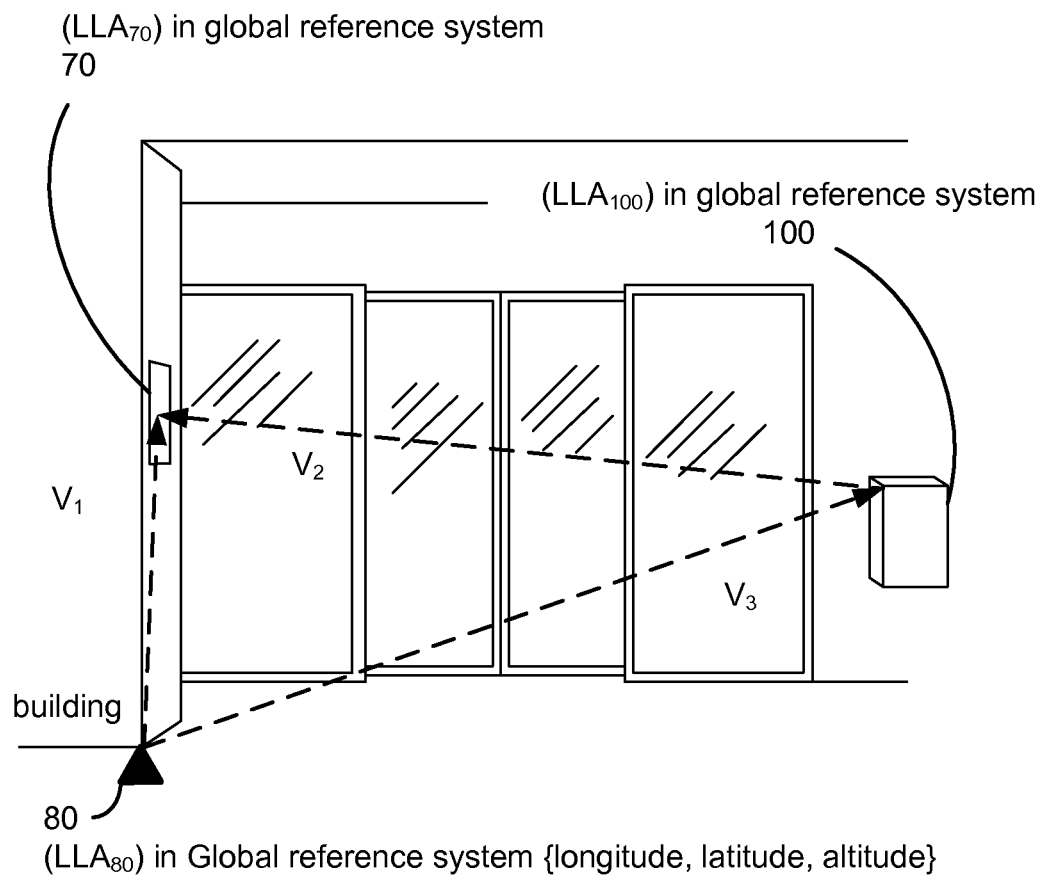
FIGS. 8 and 9 illustrate navigation scenarios in three dimensions, each including a mobile device oriented to a self-addressing source, in accordance with some embodiments of the present invention.
Figure 9:
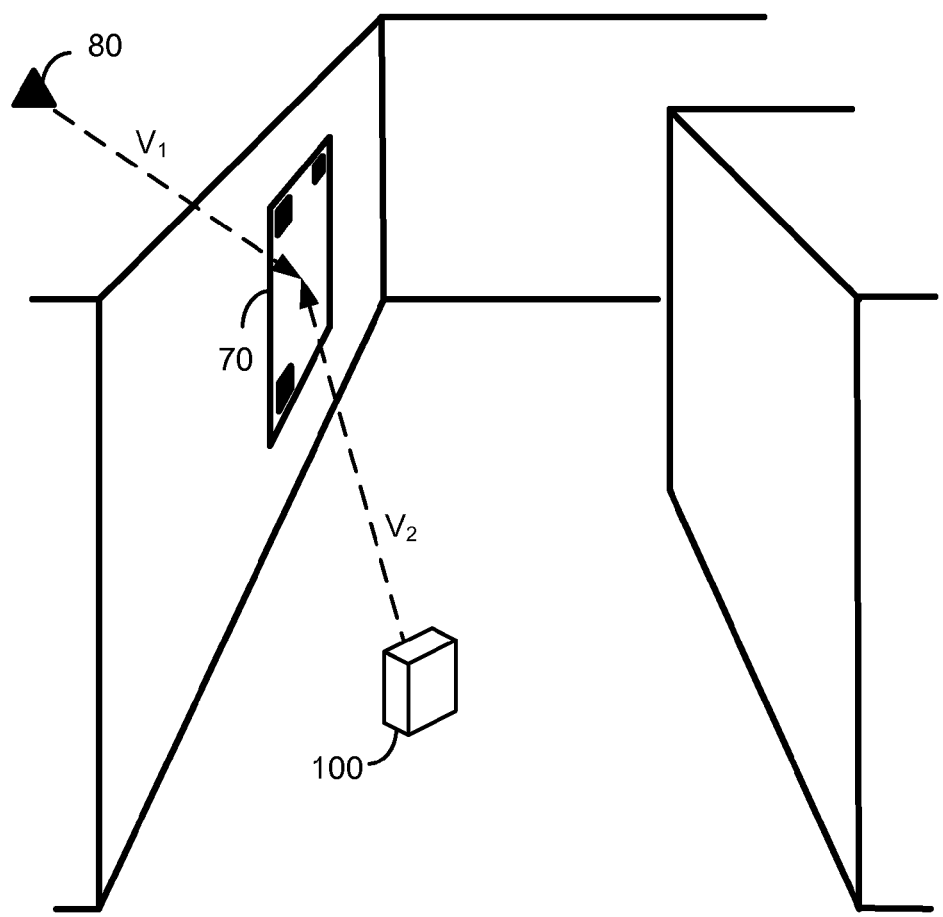

FIGS. 8 and 9 illustrate navigation scenarios in three dimensions, each including a mobile device 100 having an SAS 70 within its field of view, in accordance with some embodiments of the present invention.

FIG. 8 shows an exterior of a building relative to a global reference system and includes a reference 80 (shown near an entrance of a building), an SAS 70 (posted on a wall of the building), and a mobile device 100 (with a camera 110 directed towards the SAS 70). In some embodiments, the mobile device 100 also includes a dead-reckoning navigation system.

A global reference system is defined by a {latitude, longitude and elevation} and may be used to identify a point in space relative to the Earth. In the global reference system, the reference 80 is positioned at a point represented as ($LLA_{80}$), the SAS 70 is positioned at a point represented as ($LLA_{70}$) and the mobile device 100 is represented as point positioned at ($LLA_{100}$).

Setting an LLA location for a particular point within a building may be difficult due to a lack of adequate GNSS or GPS signal coverage. For convenience and instead of using absolute terms in the global reference system, it is often advantageous to express a point relative to the reference 80 in a local reference system. For example, a point within a building is 20 along a wall of a building from a reference point, 23.5 meters from that wall towards the interior of the building and 9 meters above this interior point, which may be expressed as (20, 23.5, 9) in a local reference system fixed to a building. A local reference system {$X_{local}$, $Y_{local}$, $Z_{local}$} may be defined by the reference 80 in which the reference 80 is arbitrarily set at the origin (0, 0, 0) of the local reference system. For example, the origin may be set to a corner of the building where the X axis is along a first wall, the Y axis is perpendicular to the first wall, and the Z axis is in a vertical direction and perpendicular to the first two axes.

Sometimes it is advantageous to express a point near the SAS 70 in an SAS reference system Similarly, the SAS 70 may be used to define an SAS reference system {$X_{SAS}$, $Y_{SAS}$, $Z_{SAS}$} in which a point of the SAS 70 is arbitrarily set at the origin (0, 0, 0) of the SAS reference system. For example, the origin may be set to a center of the SAS 70 where the X axis is along a horizontal edge of the SAS 70, the Y axis is along vertical edge of the SAS 70, and the Z axis protrudes from the SAS 70.

It may also be advantageous to express a point near the mobile device 100 in a mobile reference system. The mobile device 100 may be used to define a mobile reference system $\{X_{mobile}, Y_{mobile}, Z_{mobile}\}$ in which a corner or other point of the mobile device 100 is arbitrarily set at the origin (0, 0, 0) of the mobile reference system. For example, center of the camera 110 or a corner of the mobile device 100 is set to the origin where the X axis is along a horizontal edge of the mobile device 100, the Y axis is along vertical edge of the mobile device 100, and the Z axis protrudes from the mobile device 100 in a line of sight of the camera.

The positions of the SAS 70 and the mobile device 100 may be represented as relative vectors. A first vector $V_1$ is defined as a first displacement from the reference 80 to the SAS 70 and is typically expressed in terms of the local reference system. The first vector $V_1$ is often determined from information held by the SAS 70. A second vector $V_2$ is defined as a second displacement from the mobile device 100 to the SAS 70 and is typically expressed in terms of the SAS reference system. The second vector $V_2$ is derived from image processing. For example, analyzing and determining geometry, such as an orientation and apparent size, of the SAS 70. A third vector $V_3$ is defined as a third displacement from the reference 80 to the mobile device 100 and is typically expressed in terms of the local reference system. The third vector $V_3$ is computed from the first vector $V_1$ and second vector $V_2$.

The position of the SAS 70 ($LLA_{70}$ in the global reference system) may be computed from the position of the reference 80 ($LLA_{80}$ in the global reference system) and the first vector $V_1$. The position of the mobile device 100 ($LLA_{100}$ in the global reference system) may be computed from the position of the SAS 70 ($LLA_{70}$ in the global reference system), the pose of the SAS 70 relative to the reference 80, and the second vector $V_2$ (in the SAS reference system).

In FIG. 9, a hallway is shown with a mobile device 100 having an SAS 70 in its camera's field of view. The first vector $V_1$ extends from a reference 80 to the SAS 70, and a second vector $V_2$ extends from the mobile device 100 to the SAS 70. To simplify the second vector $V_2$, the mobile device 100 may assume the mobile device 100 is at waist level if no call is in place and at head level if a call is taking place without hands-free operation.

Figures 10, 11:
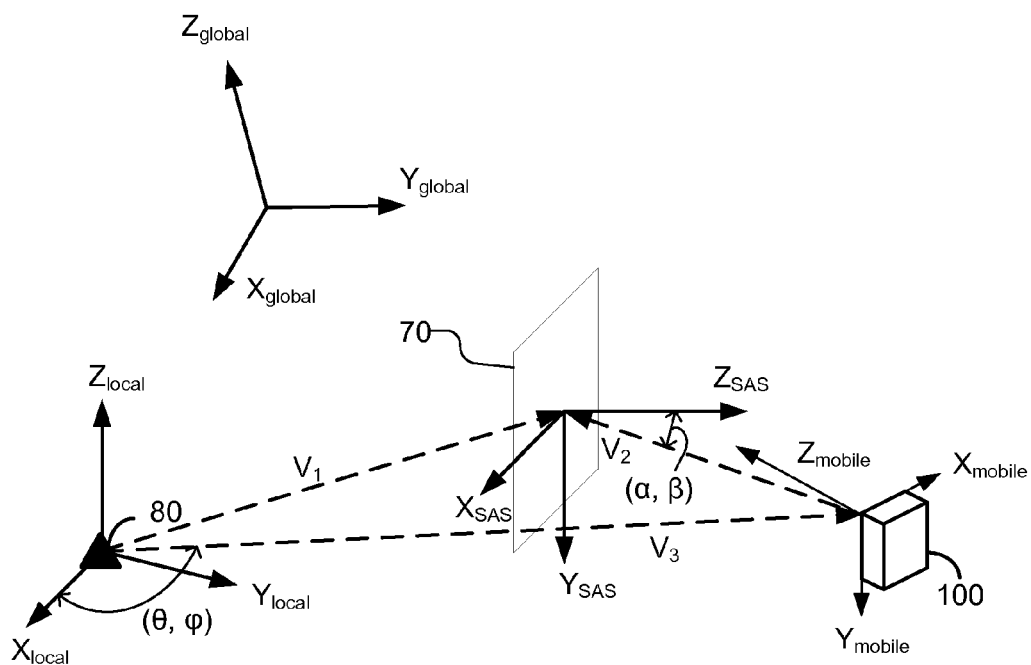
FIGS. 10-12 link reference systems, in accordance with some embodiments of the present invention.
Figure 12:
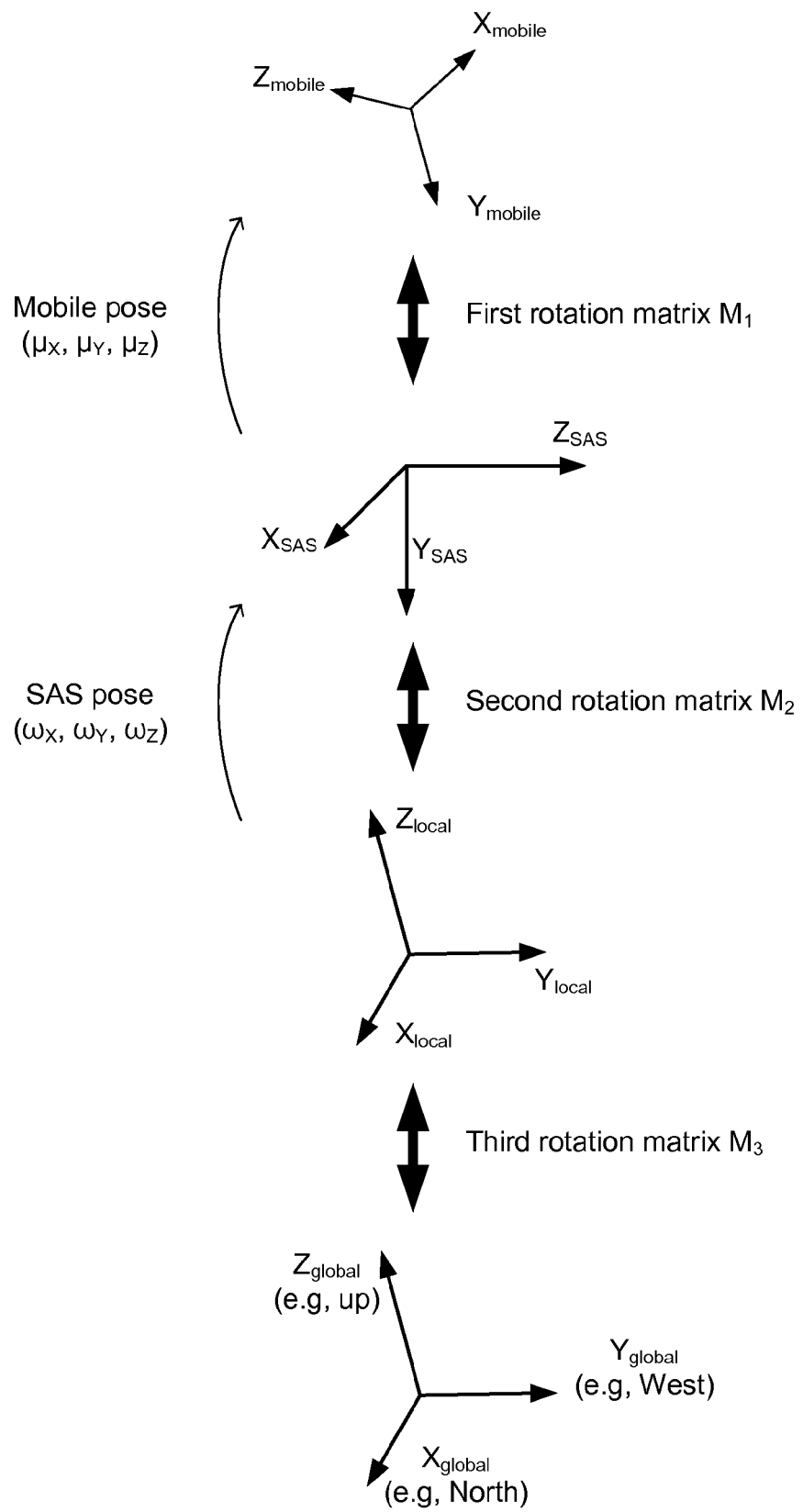

FIGS. 10-12 link reference systems, in accordance with some embodiments of the present invention.

A table in FIG. 10 summarizes positions of various locations with respect to various reference systems. The reference 80 is positioned at ($LLA_{80}$) (in the global reference system) and (0, 0, 0) (in the local reference system). The SAS 70 is positioned at ($LLA_{70}$) (in the global reference system), and (u, v, w) (in the local reference system), (0, 0, 0) (in the SAS reference system). The mobile device 100 is positioned at ($LLA_{100}$) (in the global reference system), ($\rho$, $\theta$, $\phi$) (in the local reference system in polar coordinates), (D, $\alpha$, $\beta$) (in the SAS reference system in polar coordinates), and (0, 0, 0) (in the mobile reference system).

In FIG. 11, an SAS 70 is shown relative to a reference 80 and a mobile device 100 in four different reference systems. The global reference system is defined by the Earth. A building's orientation often defines a local reference system. If a building's walls are aligned with the Cardinal directions, the local reference system may be derived from the global reference system. For example, a first wall is aligned with North and is represented by an X axis, a perpendicular wall is aligned with West and is represented by a Y axis, and a vertical direction representing "up" is indicated by a Z axis.

In the local reference system, a first vector $V_1$ is shown as a displacement between the reference 80 at (0, 0, 0) and a position (u, v, w) of the SAS 70. The pose ($\omega_X$, $\omega_Y$, $\omega_Z$) of the SAS 70 with respect to an orientation of the local reference system is represented by an angular rotation about three axes of the local reference system. The pose of the SAS 70 indicates how the SAS 70 is oriented with respect to the local reference system.

The mobile device 100 also has a pose which is often referenced with respect to the SAS 70 rather than the reference 80. The pose of the mobile device 100 may similarly be used to indicate how the mobile device 100 is oriented with respect to the SAS reference system and is indicated by three angular rotations ($\mu_X$, $\mu_Y$, $\mu_Z$).

In the SAS reference system, the second vector $V_2$ is a vector between the position of the mobile device 100 at (D, $\alpha$, $\beta$) and the position of the SAS 70 at (0, 0, 0). When expressed in the local reference system, a second vector $V_2$ is shown as a vector between the position of the mobile device 100 at ($\rho$, $\theta$, $\phi$) and the position of the SAS 70 at (u, v, w). In the local reference system, a third vector $V_3$ is shown as a vector between the reference 80 at (0, 0, 0) and the position of the mobile device 100 at ($\rho$, $\theta$, $\phi$).

FIG. 12 relates angular orientations among various reference systems. The mobile device 100 has an orientation relative to the SAS 70 indicated above as the pose of the mobile device 100. The mobile device 100 may use a first rotation matrix $M_1$ to convert an orientation expressed in the mobile reference system to an orientation expressed in the SAS reference system.

Similarly, the SAS 70 has an orientation relative to the reference 80 as indicated above as the pose of the SAS 70. The mobile device 100 may use a second rotation matrix $M_2$ to convert an orientation expressed in the SAS reference system to an orientation expressed in the local reference system.

The mobile device 100 may use a third rotation matrix $M_3$ to convert an orientation expressed in the local reference system to an orientation expressed in the global reference system. The global and local references systems may be set up with co-linear axes such that the rotation matrix $M_3$ is a 3×3 identity matrix (one along the diagonal with all other elements zero) or a trivial matrix (column and rows of the identity matrix interchanged).

The first rotation matrix $M_1$ may be initialized using a gravity vector determined from the accelerometer and using a mobile pose ($\mu_X$, $\mu_Y$, $\mu_Z$) determined from an image from the camera 110 to determine.

The second rotation matrix $M_2$ may be initialize using the SAS pose ($\omega_X$, $\omega_Y$, $\omega_Z$). The SAS pose ($\omega_X$, $\omega_Y$, $\omega_Z$) is determined directly from the SAS 70 or indirectly from the SAS 70 via a link, as described above with reference to FIG. 7. Alternatively, the second rotation matrix $M_2$ may be directly or indirectly encoded by the SAS 70.

The mobile device 100 uses the rotation matrices to convert the orientation of measurements from accelerometer and gyrometer from the mobile reference system to the local or global reference system. These measurements are generated and initially expressed with respect to the mobile reference system. The mobile device 100 uses the first rotation matrix $M_1$ to convert such measurements from the mobile reference system to the SAS reference system. The mobile device 100 then uses a second rotation matrix $M_2$ to convert the measurements in the SAS reference system to the local reference system. If necessary, the mobile device 100 then uses a third rotation matrix $M_3$ to convert the measurements in the local reference system to the global reference system.

Once expressed in the local or global reference system, the accelerometer measurements may be converted from linear acceleration measurements to linear displacement values by double integration and then accumulated to provide absolute linear movement. The gyrometer measurements may similarly be converted from angular acceleration measurements to angular displacement values by double integration and then accumulated.

The mobile device 100 also converts positions expressed in the SAS reference system to the local reference system. The mobile device 100 uses image processing to determine its position in the SAS reference system. The position of the mobile device 100 is represented by the second vector $V_2$ as (D, α, β), where D is the distance between the SAS 70 and the mobile device 100 and (α, β) represents the angle from the SAS 70 to the mobile device 100.

The first vector $V_1$ is determined based on reading the SAS 70, for example by accessing a database in a server to obtain the first vector $V_1$. Alternatively, the first vector $V_1$ is decoded directly from the SAS 70.

The second vector $V_2$ is based on image processing by the mobile device 100 using an image. For example, the mobile device 100 detects relative positioning of an SAS 70 from a single image. Alternatively, the mobile device 100 detects and tracks natural features from image to image to determine the second vector $V_2$. In some embodiments, detecting features includes using a scale-invariant feature transform (SIFT).

The mobile device 100 computes the third vector $V_3$ from a computation using the first vector $V_1$ and second vector $V_2$ to form a computed position 40. For example, the third vector $V_3$ equals a vector difference between the first vector $V_1$ and second vector $V_2$ or equivalently, a vector from (0, 0, 0) to (D, α, β) in the local reference system.

Figure 13:
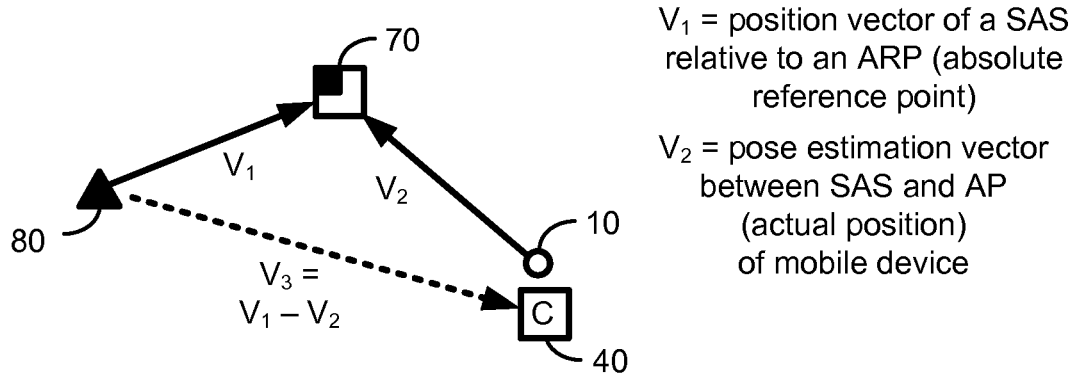
FIGS. 13-15 illustrate vector computations for determining a position estimate of a mobile device, in accordance with some embodiments of the present invention.
Figure 14:
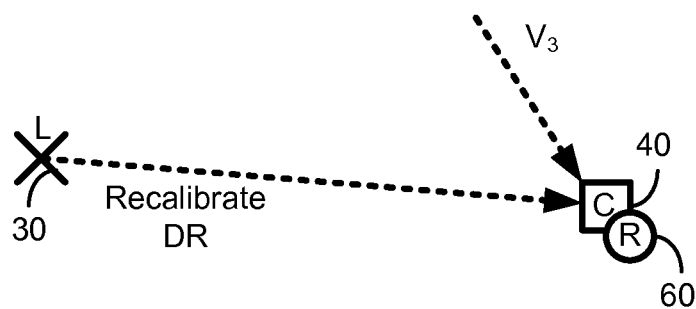
Figure 15:
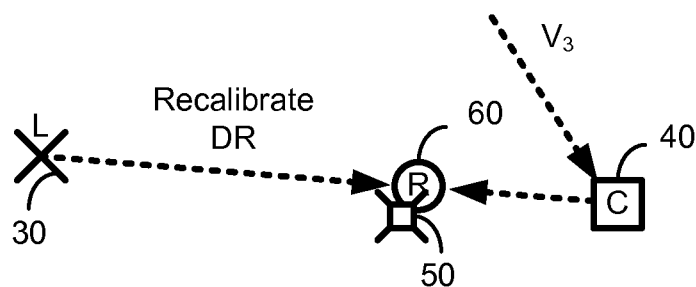

FIGS. 13-15 illustrate vector computations for determining a computed position 40 of a mobile device 100, in accordance with some embodiments of the present invention.

In FIG. 13, an initial position 10 and a computed position 40 of a mobile device 100 are shown. The first vector $V_1$ represents the direction and distance between the SAS 70 and the reference 80. The second vector $V_2$ represents the direction and distance between the SAS 70 and the mobile device 100. As described above, the second vector $V_2$ is formed by the mobile device 100 performing image processing. A third vector $V_3$ is computed from a difference of the first vector $V_1$ and second vector $V_2$ ($V_3 = V_1 - V_2$) taking into account the SAS pose. Theoretically, the computed position 40 is identical to the initial position 10. Due to inaccuracies in estimating positions and angles, however, the computed position 40 may be slightly different from the initial position 10.

In FIG. 14, a mobile device 100 recalibrates its dead-reckoning process to the computed position 40. As described above, the third vector $V_3$ results in the computed position 40. The dead-reckoning recalibration process moves the position estimate 30 to the computed position 40 thereby setting a recalibrated position 60. This recalibrated position 60 may be used in next dead-reckoning step if another positioning method (e.g., GPS or image-based positioning) is unavailable.

In FIG. 15, another dead-reckoning process uses a weighting method for recalibration. The dead-reckoning recalibrated process sets the recalibrated position 60 to a weighted average (at a weighed position estimate 50) of the computed position 40 and the position estimate 30. In most situations where the computed position 40 is expected to be more accurate than the position estimate 30, the computed position 40 is given a higher weighting. For example, the recalibrated position 60 equals 10% times the position estimate 30 plus 90% times the computed position 40.

Figure 16:
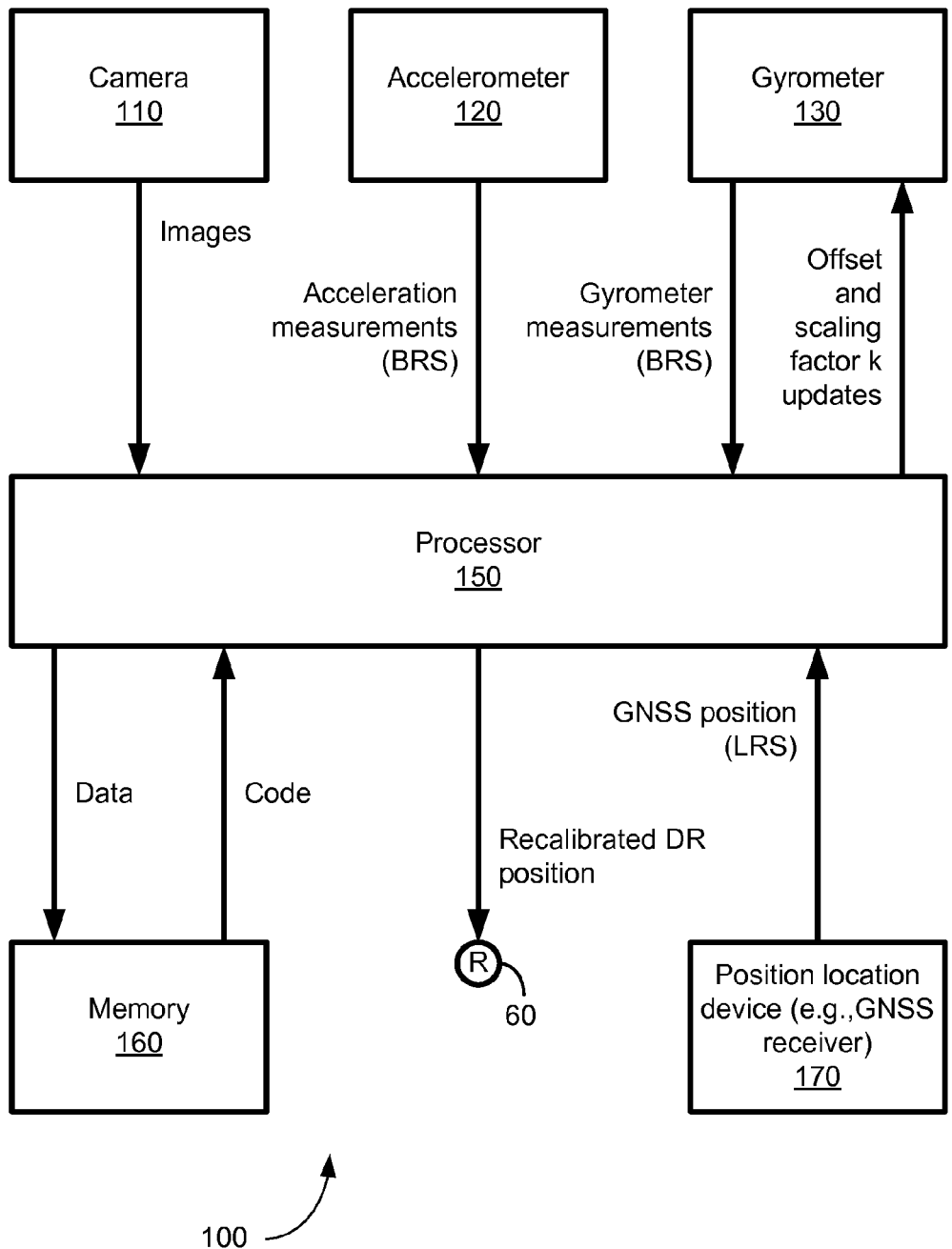
FIG. 16 illustrates a mobile device, in accordance with some embodiments of the present invention.

FIG. 16 illustrates a mobile device 100, in accordance with some embodiments of the present invention. The mobile device 100 includes a camera 110, an accelerometer 120, a gyrometer 130, a processor 150, memory 160 and a position location device 170. Each of these components or modules is coupled to the processor 150, which acts as a means for computing or a means for processing. The mobile device 100 may also include dead-reckoning navigation software and software to determine a position using one or a combination of: (1) image-based positioning using an image of an SAS 70 captured by the camera 110; (2) dead-reckoning based positioning using sensor data from the accelerometer 120, the gyrometer 130, or the combination; and (3) satellite-based position using the position location device 170.

The camera 110 provides images to the processor 150. By capturing the images, the processor 150 takes a first step at detecting the SAS 70. That is, the processor 150 processes the images to detect and interpret an SAS 70 or other features.

The accelerometer 120 provides acceleration measurements in a body reference system (BRS). The body reference system is relative to the body of the mobile device 100. The gyrometer 130 provides measurements in the body reference system. The processor 150 sets and updates the gyrometer 130 an offset and a scaling factor k the gyrometer 130. In some embodiments, the processor 150 converts sensor measurements from an orientation of the mobile device 100 to a local reference system, which is used to recalibrate the gyrometer 130 with the offset and the scaling factor k. In some embodiments, the processor 150 processes an image to determine a pose of the mobile device 100 with respect to an orientation of the SAS 70.

The position location device 170, which may include a GNSS receiver, provides a GNSS position in a local reference system. For example, the position location device 170 is a satellite and/or pseudo-lite receiver (e.g., a GPS receiver), which computes and provides a GPS-type position including a longitude and a latitude (LL), or alternatively, a longitude, a latitude and an altitude (LLA).

In some embodiments, the mobile device 100 contains either the accelerometer 120 or the gyrometer 130, while in other embodiments the mobile device 100 contains both the accelerometer 120 and the gyrometer 130. In some embodiments, the mobile device 100 includes a position location device 170 while in other embodiments the mobile device 100 does not include a position location device 170.

The memory 160 may be integrated into and/or separate from the processor 150. The memory 160 contains code of procedures and methods described herein executable by the processor 150. The processor 150 stores data to the memory 160. The data may include raw data such as images, acceleration measurements and gyrometer measurements. The data may also include intermediary data such as converted measurements, processed images, information extracted from an SAS 70, and accumulated measurements.

Based on (1) the images from the camera 110; (2) a previous position, possibly from dead reckoning and based on accumulated measurements from the accelerometer 120 and/or gyrometer 130; or (3) a GNSS position from the position location device 170, the processor 150 computes a recalibrated position 60 for possible future dead reckoning computations. Dead reckoning may be necessary when leaving an open outdoor area and entering an indoor area or an urban canyon. While indoors or in an urban canyon, satellite-based navigation may no longer be possible because GNSS signals are fully or partially blocked. During this period, a mobile device may use inertial sensor measurements and dead reckoning to compute a position estimate. In some cases, a mobile device includes a magnetometer (3D compass) to improve dead reckoning accuracy. The recalibrated position 60 may be kept internal to the processor 150 for future processing, may be interpreted and displayed to a user, or may be sent to an external application for storage or processing.

FIGS. 17-21 illustrate methods for recalibration of a DR technique, in accordance with some embodiments of the present invention.

Figure 17:
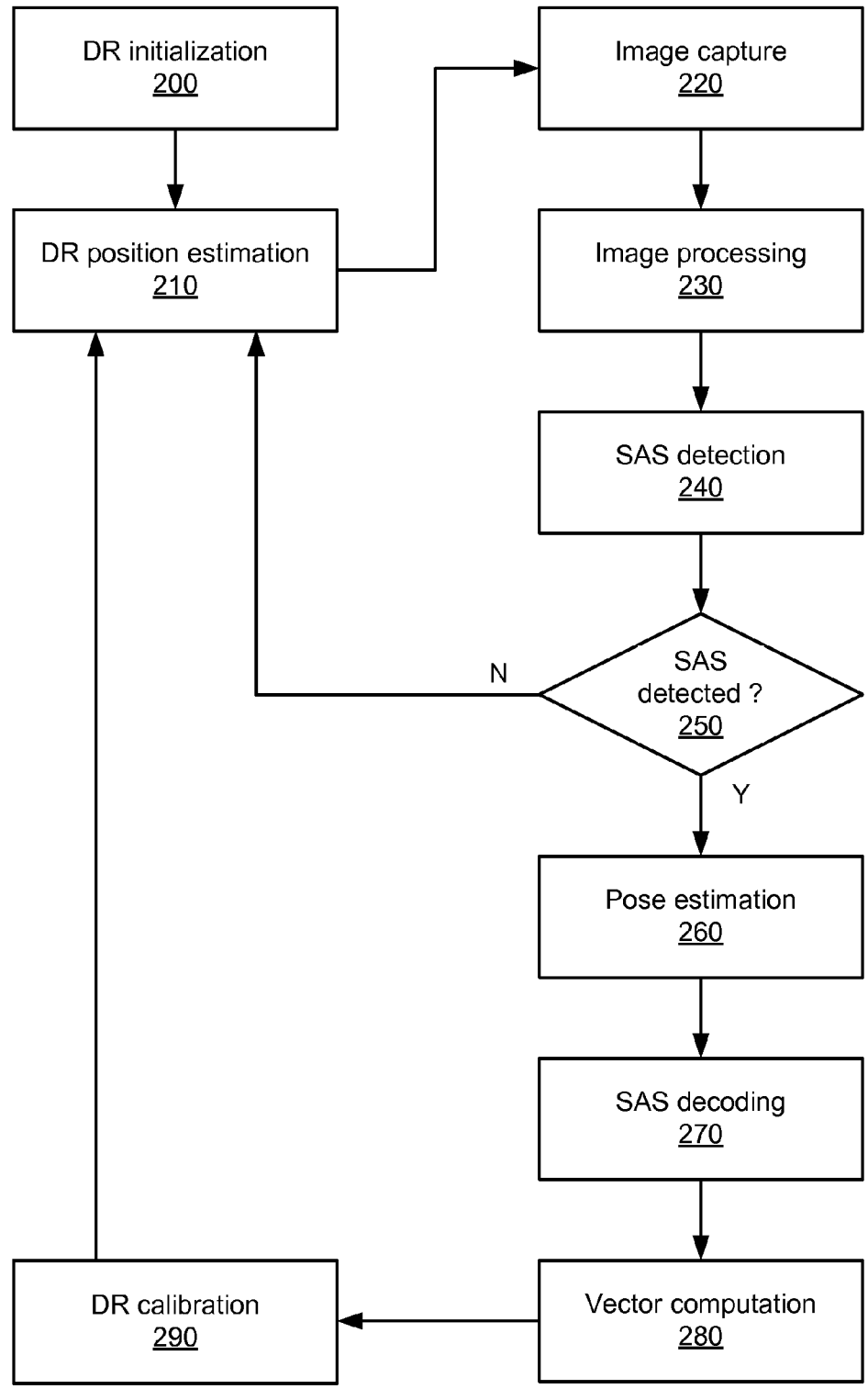
FIGS. 17-21 illustrate methods for recalibration of a DR technique, in accordance with some embodiments of the present invention.

In FIG. 17, steps performed by a processor 150 are shown. At step 200, the processor 150 initializes a dead-reckoning process and sets an initial position 10. The initial position 10 may be based on an image-based position, a GNSS-based position, or may be set as the origin (0, 0, 0) of an arbitrary reference system. At step 210, the processor 150 may use dead reckoning to determine a first updated position relative to the initial position 10. A dead reckoning-based position is estimated using measurements from an accelerometer 120 and/or a gyrometer 130. Typically, a dead reckoning position estimation is made when GNSS signals and image-based positioning are unavailable. Alternatively, a processor 150 may use image processing of an image containing an SAS 70 to determine a first updated position relative to the initial position 10. The process to determine an image-based position using an image is described below.

At step 220, the camera 110 captures an image. At step 230, the processor 150 receives and processes the image. At step 240, the processor 150 attempts to detect an SAS 70 within the processed image thereby acting a means for detecting the SAS 70. At step 250, if an SAS 70 is not detected, processing is directed to continue computing a position estimate based on dead reckoning.

If an SAS 70 is detected, processing is directed to find an image-based position. At step 260, the processor 150 estimates a range and angles to the SAS 70 relative to the mobile device 100 thereby determining the second vector $V_2$, as described above with reference to FIGS. 8 to 11. At step 270, the processor 150 decodes the SAS 70 to determine the first vector $V_1$ and an SAS pose as described above with reference to FIG. 7, thereby the processor 150 acts as a means for determining a first vector $V_1$ and a means for determining an SAS pose relative to the mobile device 100. At step 280, the processor 150 performs a vector computation to find the third vector $V_3$, which results in a computed position 40 based on the first vector $V_1$, the second vector $V_2$, and the SAS pose as described above with reference to FIGS. 11 to 13. At step 290, the processor 150 recalibrates the position estimate 30 with the computed position 40 to form the recalibrated position 60, as described above with reference to FIGS. 14 and 15, thereby the processor 150 acts as a means for recalibrating a current position of the mobile device 100 based on the third vector $V_3$.

Figure 18:
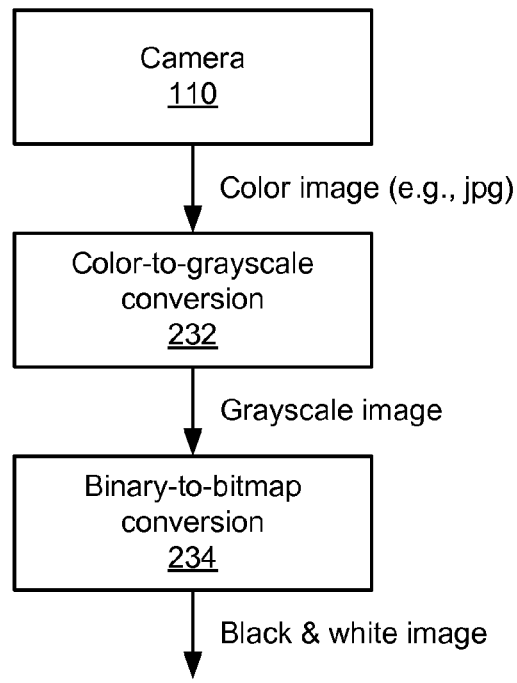

In FIG. 18, an example of image processing of step 230 is shown. The camera 110 captures a color image (e.g., a color JPEG format image). At step 232, the processor 150 executes a color-to-grayscale conversion process to transform the color image to a grayscale image. The color image contains extra information not needed by the processor 150 when detecting and interpreting an SAS 70. In some embodiments, the camera 110 provides a grayscale image rather than a color image. At step 234, the processor 150 executes a binary-to-bitmap conversion process to transform the grayscale image to a black and white image. The black and white image contains enough information for the processor 150 to detect and interpret an SAS 70 within the black and white image.

Figure 19:
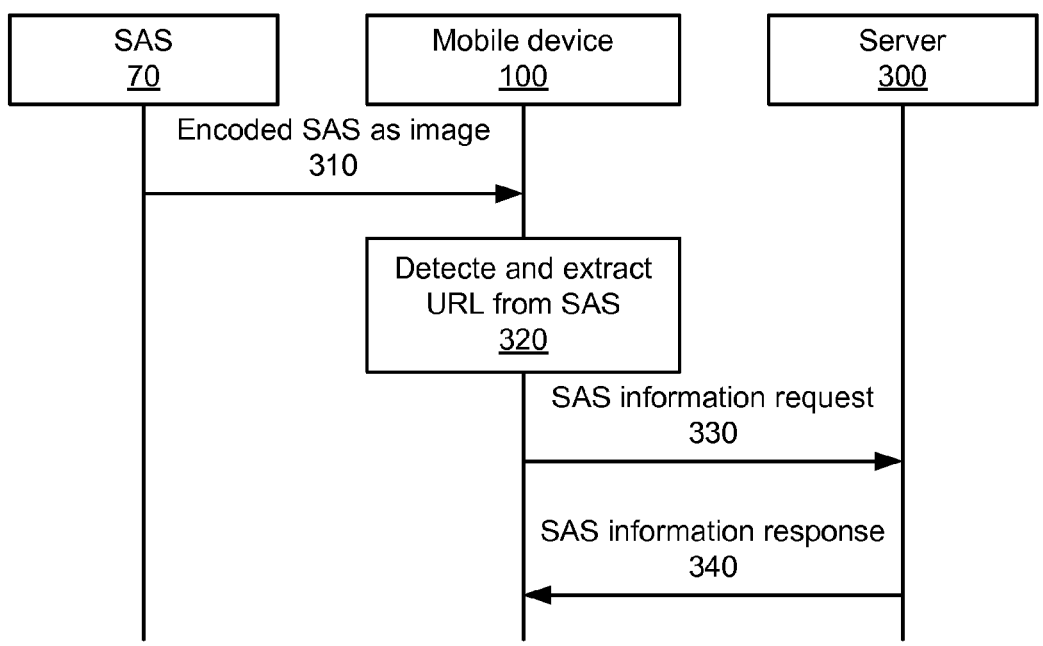

In FIG. 19, a flow diagram shows possible interaction among an SAS 70, a mobile device 100 and a server 300. The SAS 70 is positioned at a location visible to the mobile device 100. At step 310, the mobile device 100 captures an image containing the SAS 70. In this embodiment, the SAS 70 is encoded with a link (such as a URL). At step 320, the processor 150 detects and extracts the link from the SAS 70. The mobile device 100 then sends an SAS-information request 330 to a server 300. The SAS-information request 330 contains the link extracted from the SAS 70. The link is used by the server 300 to access a database containing a location or position estimate of the SAS 70 relative to a reference 80. The database may also include an uncertainty of the position estimate of the SAS 70. The database also contains a pose of the SAS 70 relative to the local reference system. Here, the server 300 acts as a reference database providing location information of the SAS 70 based on the provided link. The database contains a list of predetermined features, such as identities of SASs 70, and a corresponding location and SAS pose relative to a reference.

In some embodiments, the mobile device 100 assists in providing crowd-source location information about the SAS 70. Before sending the SAS-information request 330 to the server 300, the mobile device 100 determines an estimated displacement from itself to the SAS 70, referred above as the second vector $V_2$. The mobile device 100 combines its last determined mobile location with this displacement from the mobile device 100 to the SAS 70, thereby approximating a location of the SAS 70. In some embodiments, the SAS 70 does not include a location or an index to a location. In some cases, the location provided by the SAS 70 may be incorrect. In these embodiments and cases, the mobile device 100 acts to inform a server of its estimate of the SAS 70. The mobile device 100 then builds the SAS-information request 330, which incorporates this approximate location of the SAS 70 into the SAS-information request 330. The mobile device 100 may also estimate an SAS pose, which may be included in the SAS-information request 330. The mobile device 100 may send the approximate location of the SAS 70 and if available, estimated SAS pose, in a separate message.

An identity and the approximate location of the SAS 70 are then sent to the server 300. The server 300 may act as a crowd-sourcing server or may forward the identity and the approximate location of the SAS 70 to a crowd-sourcing server. The crowd-sourcing server can then build a database of a number of self-addressing sources, such as SAS 70. As more mobile devices 100 report the identity and the corresponding location of the SAS 70 and estimated SAS pose, the location estimate of each SAS 70 and SAS pose may be improved over time.

After the crowd-sourcing server obtains at least one location estimate of the SAS 70, the crowd-sourcing server may support location requests from other mobile devices that have no navigation or location estimating capabilities. These non-navigation capable devices will capture an image containing an SAS 70, extract the information within an SAS 70, send an SAS-information request 330 to the server 300 and receive a location estimate of the SAS 70 in an SAS-information response 340. In this manner, the server 300 is updated by navigation-capable mobile devices but supports location requests from both navigation-capable and non-navigation-capable mobile devices. Therefore, the SAS 70 may or may not include a position or an index to a position. However, using such a crowd-souring server, a later mobile device, coming into view of the SAS 70 sometime after the crowd-sourcing database is built up in the future, may access the position of the SAS 70 from the crowd-sourcing server. In this manner, the later mobile device may determine its position without satellite positioning signals and without dead reckoning but with only a camera and access to the crowd-sourcing server.

When the SAS-information request 330 contains position information related to the SAS 70, the mobile device 100 determines this position information. The position information related to the SAS 70 includes a position estimate (and possibly a corresponding uncertainty of the SAS 70) determined based on the last position estimate for the mobile device 100 (which may be a GNSS-based position, a dead reckoning-based position, or an earlier image-based position estimate) and possibly an SAS pose estimate. A mobile device 100 less sophisticated and incapable of determining a position estimate of the SAS 70 may substitute its own location estimate for the location estimate of the SAS 70 when building the SAS-information request 330. The SAS-information request 330 may contain a field that indicates if the location provided is the location estimate of the SAS 70 or the location estimate of the mobile device 100. The server 300 may accumulate a number of position estimates of the SAS 70 weighted by the corresponding uncertainty from a number of mobile devices 100 to arrive at or refine position estimates contained in the database for each SAS 70. As such, a location of an SAS 70 does not need to be determined a priori. Instead, the server 300 may actively update its database based on location estimates within the SAS-information request 330 messages.

In response to the SAS-information request 330 messages, the server 300 sends an SAS-information response 340. The SAS-information response 340 may contain the absolute position of the SAS 70 (e.g., the LLA of the SAS 70) or may contain a relative position of the SAS 70 with reference to a known point (e.g., the first vector $V_1$ relative to a reference 80).

Based on the information retrieved from the server 300 and a second vector $V_2$ calculation, the mobile device 100 may determine its position as described above. The server 300 may also provide the mobile device 100, within the SAS-information response 340 or a secondary message, with information about nearby points of interest based on the SAS-information request 330. For example, if the SAS 70 is in a window of a first store in a shopping mall, the nearby point of interest may be a second store neighboring the first store, or may be a second store that is a competitor to the first store.

Figure 20:
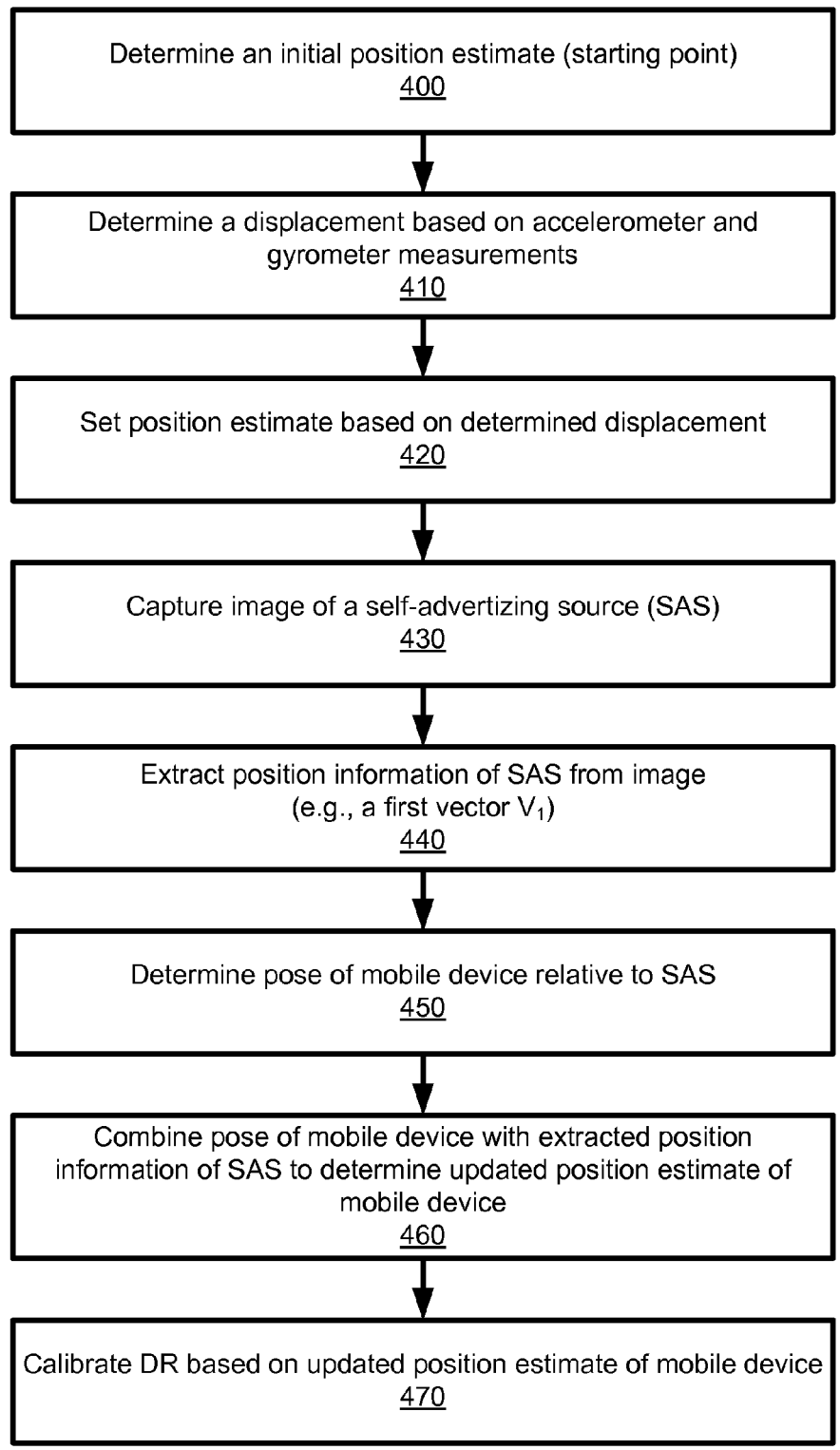

In FIG. 20, a procedure for calibrating navigation, such as to calibrate dead reckoning, is shown. At step 400, the processor 150 determines an initial position estimate to act as a starting point. This starting point may be based on GNSS information or on an SAS-determined position. Alternately, the initial position may be arbitrarily set and later determined as an absolute position from a future determined position by backtracking along dead-reckoning steps.

At step 410, measurements from an accelerometer 120 and/or a gyrometer 130 are accumulated to determine a displacement from the starting point. At step 420, an estimate of a current position is set based on the initial position and the displacement. At step 430, a camera 110 captures an image containing an SAS 70. At step 440, the processor 150 extracts position information from the SAS 70 to form the first vector $V_1$ and an SAS pose. At step 450, the mobile device 100 determines a range and angular displacement to the SAS 70 from the mobile device 100 to form the second vector $V_2$. At step 460, the processor 150 combines the first vector $V_1$, SAS pose and the second vector $V_2$ to form the third vector $V_3$ thereby determining an updated position estimate of the mobile device 100. At step 470, the processor 150 calibrates its last position estimate with the updated position estimate.

Figure 21:
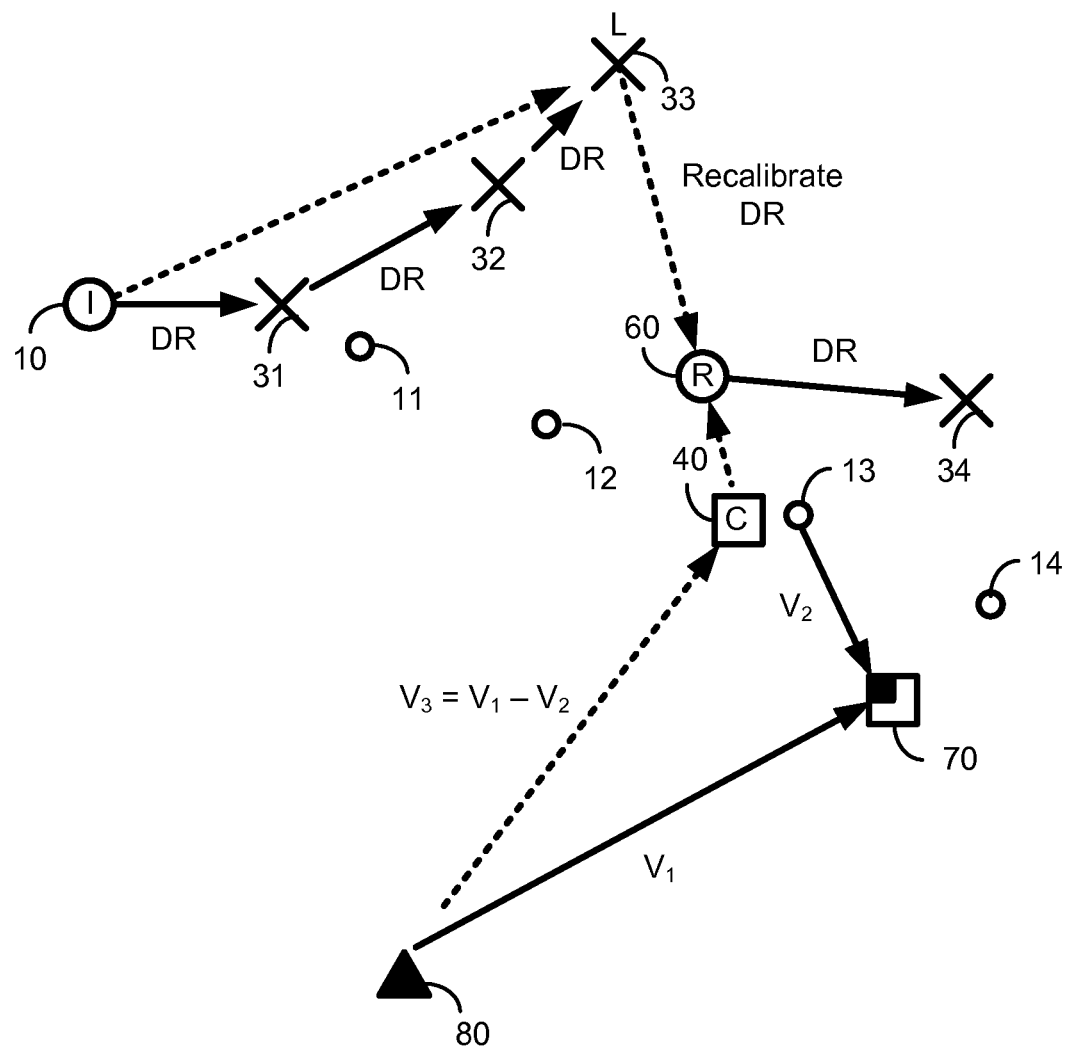

In FIG. 21, a process of estimating positions along a route from an initial position 10 to a final position 14 is shown. A mobile device 100 starts at an initial position 10, which may be a GNSS-based position, such as a GPS-based position.

During a first period, the mobile device 100 moves from the initial position 10 to a first intermediate position 11. At the end of this first period, the processor 150 determines a first position estimate 31 using dead reckoning based on the initial position 10 and inertial sensor measurements from one or more inertial sensors. In some embodiments, dead reckoning determines a step direction from a magnetometer and a step distance using an accelerometer 120. The act of determining a first position estimate 31 may use a simultaneous localization and mapping (SLAM) algorithm. However, because of errors inherent with accumulating measurements from the accelerometer 120 and the gyrometer 130, the first position estimate 31 inaccurately shows the first intermediate position 11.

During a second period, the mobile device 100 moves from the first intermediate position 11 to a second intermediate position 12. At the end of this second period, the processor 150 determines a second position estimate 32 based on measurements from an accelerometer 120 and/or gyrometer 130 and the first intermediate position 11. As shown, position estimates continue to deviate from actual positions.

During a third period, the mobile device 100 moves from the second intermediate position 12 to a third intermediate position 13. The processor 150 detects an SAS 70 as shown by the second vector $V_2$ and extracts an SAS pose. In some embodiments, the SAS 70 is a QR code, a bar code (one-dimensional bar code or two-dimensional bar code), text and/or a wireless transmitter (such as an RF ID tag) containing information to form the first vector $V_1$ and SAS pose, or a link to a database on a server 300 to this information. The processor 150 uses this information to set a first vector $V_1$ then combines the first vector $V_1$ and the second vector $V_2$ to form the third vector $V_3$, which represent a computed position 40 of a mobile device 100. The computed position 40 may be used as the recalibrated position 60 for the position estimate 34. Alternatively, the processor 150 may also determine a third position estimate 33, which may be weighted with the computed position 40 to form the recalibrated position 60.

During a fourth period, the mobile device 100 moves from the third intermediate position 13 to a final position 14. Rather than using the third position estimate 33 as a reference position, the dead reckoning process uses the recalibrated position 60, which was based on information from the SAS 70.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable storage medium tangibly embodying instructions may be used in implementing the methodologies described herein. For example, software codes may be stored in a memory and executed by a processor unit. Memory may be implemented within the processor unit or external to the processor unit. As used herein memory 160 refers to any type of long term, short term, volatile, nonvolatile, or other memory and is not to be limited to any particular type of memory or number of memories, or type of media upon which memory is stored.

If implemented in firmware and/or software, the functions may be stored as one or more firmware or software instructions or code on a computer-readable storage medium. A computer-readable storage medium includes program code stored thereon. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for calibrating navigation in a mobile device comprising a camera and an inertial sensor, the method comprising:
    providing an initial position without using any SASs (self-addressing sources);
    detecting an SAS (self-addressing source);
    determining a first vector $V_1$ between the SAS and a reference point;
    determining an SAS pose relative to the reference point;
    determining a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;
    computing a third vector $V_3$ of the mobile device based on the first vector $V_1$ and the second vector $V_2$, wherein $V_3 = V_1 - V_2$;
    computing a current position of the mobile device based on the third vector $V_3$; and
    recalibrating the inertial sensor based on the current position.

2. The method of claim 1, wherein the initial position comprises an origin (0, 0, 0).

3. The method of claim 1, wherein the initial position comprises an image-based position estimate.

4. The method of claim 1, wherein the initial position comprises a global navigation satellite systems based position (GNSS-based position).

5. The method of claim 1, wherein the SAS comprises a quick response code (QR code).

6. The method of claim 1, wherein the SAS comprises a bar code.

7. The method of claim 1, wherein the SAS comprises text.

8. The method of claim 1, wherein the SAS comprises a link to a database.

9. The method of claim 1, wherein the SAS comprises a wireless transmitter.

10. The method of claim 9, wherein the wireless transmitter comprises an RF ID tag.

11. The method of claim 1, further comprising determining a mobile pose relative to the SAS.

12. The method of claim 1, wherein detecting the SAS comprises capturing an image of the SAS and wherein determining the second vector $V_2$ comprises determining geometry of the SAS in the image.

13. The method of claim 1, wherein the inertial sensor comprises a gyrometer.

14. The method of claim 1, wherein the detecting the SAS comprises using a scale-invariant feature transform (SIFT).

15. The method of claim 1, further comprising
    sending an SAS information request to a server having a database, wherein the database includes the first vector $V_1$; and
    receiving an SAS information response, from the server, comprising the first vector $V_1$.

16. The method of claim 15, wherein the SAS information request comprises a position estimate of the SAS determined by the mobile device.

17. The method of claim 16, wherein the SAS information request further comprises an estimated SAS pose determined by the mobile device.

18. The method of claim 16, wherein the position estimate of the SAS comprises an estimated position of the mobile device.

19. The method of claim 15, wherein the SAS information response further comprises an SAS pose from the database.

20. The method of claim 1, further comprising using dead reckoning to determine a first updated position relative to the initial position.

21. The method of claim 20, wherein using dead reckoning comprises using a simultaneous localization and mapping (SLAM) algorithm.

22. The method of claim 20, wherein using dead reckoning comprises:
    determining a direction using a magnetometer; and
    determining a step using an accelerometer.

23. The method of claim 1, further comprising determining an estimated position of the SAS based on the second vector $V_2$ and the initial position.

24. A mobile device comprising a camera and a navigation system including an inertial sensor, the mobile device comprising:
means for providing an initial position without using any SASs (self-addressing sources);
means for detecting an SAS (self-addressing source);
means for determining a first vector $V_1$ between the SAS and a reference point;
means for determining an SAS pose relative to the reference point;
means for determining a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;
means for computing a third vector $V_3$ of the mobile device based on the first vector $V_1$ and the second vector $V_2$, wherein $V_3=V_1-V_2$;
means for computing a current position of the mobile device based on the third vector $V_3$; and
means for recalibrating the inertial sensor based on the current position.

25. A mobile device comprising a processor and a memory and further comprising a camera and an inertial sensor, wherein the memory includes software instructions to:
provide an initial position without using any SASs (self-addressing sources);
detect an SAS (self-addressing source);
determine a first vector $V_1$ between the SAS and a reference point;
determine an SAS pose relative to the reference point;
determine a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;
compute a third vector $V_3$ of the mobile device based on the first vector $V_1$ and the second vector $V_2$, wherein $V_3=V_1-V_2$;
compute a current position of the mobile device based on the third vector $V_3$; and
recalibrate the inertial sensor based on the current position.

26. A non-transitory computer-readable storage medium including program code stored thereon for a mobile device comprising a camera and an inertial sensor, the program code comprising code to:
provide an initial position without using any SASs (self-addressing sources);
detect an SAS (self-addressing source);
determine a first vector $V_1$ between the SAS and a reference point;
determine an SAS pose relative to the reference point;
determine a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;
compute a third vector $V_3$ of the mobile device based on the first vector $V_1$ and the second vector $V_2$, wherein $V_3=V_1-V_2$;
compute a current position of the mobile device based on the third vector $V_3$; and
recalibrate the inertial sensor based on the current position.

27. A method for determining a position of a mobile device comprising a camera and an inertial sensor, the method comprising:
providing an initial position without using any SASs (self-addressing sources);
detecting an SAS (self-addressing source);
determining a first vector $V_1$ between the SAS and a reference point;
determining an SAS pose relative to the reference point;
determining a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;
computing a third vector $V_3$ of the mobile device based on the first vector $V_1$ and the second vector $V_2$, wherein $V_3=V_1-V_2$;
computing a current position of the mobile device based on the third vector $V_3$; and
recalibrating the inertial sensor based on the current position.

28. The method of claim 27, wherein the SAS comprises a quick response code (QR code).

29. The method of claim 27, wherein the SAS comprises a bar code.

30. The method of claim 27, wherein the SAS comprises text.

31. The method of claim 27, wherein the SAS comprises a link to a database.

32. The method of claim 27, wherein the SAS comprises a wireless transmitter.

33. The method of claim 32, wherein the wireless transmitter comprises an RF ID tag.

34. The method of claim 27, further comprising determining a mobile pose relative to the SAS.

35. The method of claim 27, wherein detecting the SAS comprises capturing an image of the SAS and wherein determining the second vector $V_2$ comprises determining geometry of the SAS in the image.

36. The method of claim 27, wherein the detecting the SAS comprises using a scale-invariant feature transform (SIFT).

37. The method of claim 27, further comprising
sending an SAS information request to a server having a database, wherein the database includes the first vector $V_1$; and
receiving an SAS information response, from the server, comprising the first vector $V_1$.

38. The method of claim 37, wherein the SAS information request comprises a position estimate of the SAS determined by the mobile device.

39. The method of claim 38, wherein the SAS information request further comprises an estimated SAS pose determined by the mobile device.

40. The method of claim 38, wherein the position estimate of the SAS comprises an estimated position of the mobile device.

41. The method of claim 37, wherein the SAS information response further comprises an SAS pose from the database.

42. The method of claim 27, further comprising determining an estimated position of the SAS based on the second vector $V_2$ and the initial position.

43. A mobile device comprising a camera and an inertial sensor, the mobile device comprising:
means for providing an initial position without using any SASs (self-addressing sources);
means for detecting an SAS (self-addressing source);

means for determining a first vector $V_1$ between the SAS and a reference point;

means for determining an SAS pose relative to the reference point;

means for determining a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;

means for computing a third vector $V_3$ of the mobile device based on the first vector $V_1$ and the second vector $V_2$, wherein $V_3=V_1-V_2$;

means for computing a current position of the mobile device based on the third vector $V_3$; and recalibrating the inertial sensor based on the current position.

44. A mobile device comprising a processor and a memory and further comprising a camera and an inertial sensor, wherein the memory includes software instructions to:

provide an initial position without using any SASs (self-addressing sources);

detect an SAS (self-addressing source);

determine a first vector $V_1$ between the SAS and a reference point;

determine an SAS pose relative to the reference point;

determine a second vector $V_2$ of the mobile device relative to the SAS, wherein the second vector V2 is determined based from an image of the SAS captured by the camera and wherein the second vector $V_2$ is represented by a displacement from the mobile device to the SAS and an angle from the mobile device to the SAS;

compute a third vector $V_3$ of the mobile device based on the first vector $V_1$ and the second vector $V_2$, wherein $V_3=V_1-V_2$;

compute a current position of the mobile device based on the third vector $V_3$; and recalibrate the inertial sensor based on the current position.

45. A non-transitory computer-readable storage medium including program code stored thereon for a mobile device comprising a camera and an inertial sensor, the program code comprising code to:

provide an initial position without using any SASs (self-addressing sources);

detect an SAS (self-addressing source);

determine a first vector $V_1$ between the SAS and a reference point;

determine an SAS pose relative to the reference point;

determine a second vector $V_2$ of the mobile device relative to the SAS, wherein the second vector $V_2$ is determined based from an image of the SAS captured by the camera and wherein the second vector $V_2$ is represented by a displacement from the mobile device to the SAS and an angle from the mobile device to the SAS;

compute a third vector $V_3$ of the mobile device based on the first vector $V_1$ and the second vector $V_2$, wherein $V_3=V_1-V_2$;

compute a current position of the mobile device based on the third vector $V_3$; and recalibrating the inertial sensor based on the current position.

* * * * *